(12) United States Patent
Gaugler et al.

(10) Patent No.: US 10,746,579 B2
(45) Date of Patent: Aug. 18, 2020

(54) METHOD OF OPERATING A FLUID METER, AND FLUID METER

(71) Applicant: DIEHL METERING GMBH, Ansbach (DE)

(72) Inventors: Ulrich Gaugler, Weidenbach (DE); Frederik Neder, Erlangen (DE)

(73) Assignee: Diehl Metering GmbH, Ansbach (DE)

( * ) Notice: Subject to any disclaimer, the term of this patent is extended or adjusted under 35 U.S.C. 154(b) by 40 days.

(21) Appl. No.: 16/239,587

(22) Filed: Jan. 4, 2019

(65) Prior Publication Data
US 2019/0226891 A1    Jul. 25, 2019

(30) Foreign Application Priority Data
Jan. 19, 2018 (DE) .......................... 10 2018 000 414

(51) Int. Cl.
G01F 1/66 (2006.01)
G01F 15/02 (2006.01)
G01F 1/69 (2006.01)
G01F 1/696 (2006.01)

(52) U.S. Cl.
CPC .............. *G01F 1/662* (2013.01); *G01F 1/667* (2013.01); *G01F 1/6965* (2013.01); *G01F 15/028* (2013.01)

(58) Field of Classification Search
CPC .............. G01F 1/66; G01F 15/02; G01F 1/69
See application file for complete search history.

(56) References Cited

U.S. PATENT DOCUMENTS

| | | | |
|---|---|---|---|
| 7,000,465 B1 | 2/2006 | L'Bassi et al. | |
| 7,331,224 B2* | 2/2008 | Padmanabhan | G01F 1/6842 73/204.26 |
| 7,797,997 B2* | 9/2010 | Wu | G01F 1/6845 73/204.26 |
| 8,266,957 B2 | 9/2012 | Koudal et al. | |
| 8,346,491 B2* | 1/2013 | Loose | G01F 1/666 324/306 |
| 9,239,257 B2* | 1/2016 | Olin | G01F 1/692 |
| 10,295,387 B2* | 5/2019 | Bonomi | F16K 27/067 |
| 2006/0009926 A1 | 1/2006 | Larson | |

(Continued)

FOREIGN PATENT DOCUMENTS

DE    19961036 A1    7/2001
DE    102006057208 A1    6/2008

(Continued)

*Primary Examiner* — Jewel V Dowtin
(74) *Attorney, Agent, or Firm* — Laurence A. Greenberg; Werner H. Stemer; Ralph E. Locher

(57) ABSTRACT

A fluid meter is operated, in particular, for flow quantity determination of a flowing medium. A flow quantity determination is carried out with the aid of a measuring arrangement. A sensor arrangement determines a position and/or inclination. An axial and/or angular position of the fluid meter in relation to at least one establishable axis and/or direction is determined by way of the sensor arrangement, and the axial and/or angular position is used for the correction of the measurement values of the measuring arrangement. In addition, a convection flow of the medium is determined in the fluid meter, and a corrective for the measurement values of the measuring arrangement is derived from the convection flow which has been determined.

22 Claims, 2 Drawing Sheets

(56) References Cited

U.S. PATENT DOCUMENTS

| | | |
|---|---|---|
| 2007/0151363 A1 | 7/2007 | Ramsesh |
| 2007/0219650 A1 | 9/2007 | Wang et al. |
| 2010/0126267 A1* | 5/2010 | Agam ................ G01F 23/2961 73/290 V |
| 2010/0242593 A1* | 9/2010 | Lagergren ................ G01D 5/48 73/290 V |
| 2017/0138773 A1* | 5/2017 | D'Souza-Matthew ...................... G01F 1/667 |
| 2019/0293464 A1* | 9/2019 | Liu .......................... G01F 1/667 |

FOREIGN PATENT DOCUMENTS

| | | |
|---|---|---|
| DE | 102008063261 A1 | 7/2010 |
| JP | 2001174302 A | 6/2001 |

* cited by examiner

METHOD OF OPERATING A FLUID METER, AND FLUID METER

CROSS-REFERENCE TO RELATED APPLICATION

This application claims the priority, under 35 U.S.C. § 119, of German patent application DE 10 2018 000 414.8, filed Jan. 19, 2018; the prior application is herewith incorporated by reference in its entirety.

BACKGROUND OF THE INVENTION

Field of the Invention

The present invention relates to a fluid meter and to a method for operating a fluid meter for flow quantity determination of a medium. The flow quantity determination is carried out with the aid of a measuring arrangement. A sensor arrangement for position and/or inclination determination is provided, and an axial and/or angular position of the fluid meter in relation to at least one established axis and/or direction is determined by means of the sensor arrangement. The axial and/or angular position is used for correcting the measurement values of the measuring arrangement.

Fluid meters of the species are conventionally used to determine flow quantities of a fluid or medium in a fluid line network. Such fluid meters conventionally have a connection housing with an inlet and an outlet, by means of which the fluid meter can be installed in the fluid line network. The flow direction of the fluid inside the fluid meter may extend from the inlet to the outlet, or may also be directed oppositely depending on the design of the fluid meter.

For the most part, such fluid meters are used as water meters for determining the drinking water consumption in buildings as well as industrial and commercial units, or as heat meters for determining consumed heat energy. Increasingly, in this case, ultrasonic fluid meters are also being used besides mechanical fluid meters. The functionality of an ultrasonic fluid meter is based on the use of ultrasound transducers, which are arranged in the region of the connection housing of the ultrasonic fluid meter. The ultrasound signals of the ultrasound transducers, so-called ultrasound bursts, are in this case emitted and received along the ultrasound measurement section.

The flow and/or volume determination of a flowing medium by means of an ultrasound transducer arrangement may, for example, be carried out with the aid of a time-of-flight difference measurement of the ultrasound signals (time-of-flight difference method). The time-of-flight difference is, for example, determined by an ultrasound signal being emitted between two ultrasound transducers along the ultrasound measurement section in and counter to the flow direction of the medium.

The transmission of the ultrasound signal from one ultrasound transducer to the other ultrasound transducer along the ultrasound measurement section in this case takes place more rapidly in the flow direction of the medium than counter to the flow direction of the medium. From this time difference of the times of flight of the ultrasound signals, a time-of-flight variance or time-of-flight difference is determined. With the aid of the time-of-flight difference and the previously known size of the ultrasonic fluid meter, the flow and/or the volume of the flowing medium can subsequently be determined. Naturally, however, particularly in the low flow range and when stationary, measurement errors occur since the interior of the ultrasonic fluid meter is weighted more strongly than the edge during the time-of-flight difference measurement, and the flow in the interior generally has a different strength, or direction.

German published patent application DE 10 2008 063 261 A1 discloses a fluid meter, or a volume meter, for liquids, which comprises a volume measuring instrument for volume determination of the medium as well as a sensor arrangement having at least one inclination sensor. The sensor arrangement is in this case used to determine the axial and/or angular position of the volume meter in relation to the installation position. Furthermore, the volume meter has an arithmetic unit which carries out optimization of the measurement properties, and therefore improvement of the measurement results, by processing the position information of the sensor arrangement.

German published patent application DE 199 61 036 A1 describes a water meter and a method for operating a water meter, in which the installation position of the water meter is detected and the measurement results of the water meter are subsequently corrected as a function of the installation position. The water meter in this case has means for detecting the installation position, for example optical, inductive or capacitive sensors. In this way, position-dependent measurement errors can be eliminated. However, measurement inaccuracies which occur for example because of convection flows in the medium cannot be determined and reduced.

BRIEF SUMMARY OF THE INVENTION

It is accordingly an object of the invention to provide a fluid meter and a method for operating a fluid meter which overcomes the above-mentioned and other disadvantages of the heretofore-known devices and methods of this general type and which provides for an improved measurement accuracy in comparison with the prior art.

With the foregoing and other objects in view there is provided, in accordance with the invention, a method of operating a fluid meter, the method comprising:

carrying out a flow quantity determination by way of a measuring arrangement;

providing a sensor arrangement for at least one of a position determination or an inclination determination;

causing the sensor arrangement to determine at least one of an axial position or angular position of the fluid meter in relation to at least one establishable axis and/or direction;

using at least one of the axial position or the angular position for correcting of measurement values acquired by the measuring arrangement; and determining a convection flow of the medium in the fluid meter, and deriving a correction (i.e., a corrective parameter) for the measurement values of the measuring arrangement from the convection flow.

In other words, in the method for operating a fluid meter for flow quantity determination of a preferably flowing medium, the flow quantity determination is carried out with the aid of a measuring arrangement. Furthermore, a sensor arrangement is used for position and/or inclination determination, by means of which an axial and/or angular position of the fluid meter in relation to at least one establishable axis and/or direction is determined. The axial and/or angular position is in this case, in particular, used for correction of the measurement values of the measuring arrangement which relate to the flow quantity determination.

According to the invention, a convection flow of the medium is determined in the fluid meter, a correction for the measurement values of the measuring arrangement being derived from the convection flow which has been determined. For example, the size (i.e. the height or strength) and the direction of the convection flow may be determined. In this way, the effect of the convection flow on the measurement values of the measuring arrangement can be reduced or eliminated. For example by the measurement values being corrected correspondingly (for example being corrected computationally by a correction term, or the correction), so that the measurement accuracy of the fluid meter is improved to a significant extent. In particular, an improvement in the low measurement range in the case of small flows can thereby be achieved in a water meter, or bulk water meter. Furthermore, the measurement dynamics are thereby increased.

Preferably, the temperature of the medium and/or of the connection housing is used for detection of the convection flow, or the size of the convection flow. For example by the convection inside the fluid meter being commensurately greater when the difference between the temperature of the connection housing and the temperature of the medium is higher. In order to determine the temperature of the medium, correlating temperature and convection-flow values may therefore be read out, for example with the aid of a correlation matrix.

Expediently, the temperature of the medium may be determined in or outside the fluid meter. In a practical way, the temperature of the medium may therefore be determined inside the fluid meter (for example by means of a temperature sensor, a temperature probe, an ultrasound measurement or the like) or outside the fluid meter (for example by means of an external sensor). The temperature of the medium determined outside the fluid meter may subsequently be transmitted to the fluid meter, or to a control and evaluation instrument of the fluid meter, for example by means of data-cable or radio transmission.

In the same way, the temperature of the connection housing may also be determined, for example by means of a temperature sensor or the like. For example, by comparison of the temperatures, a temperature difference between the temperature of the connection housing and the temperature of the medium may be determined, which may be used as a measure of the level of the convection flow. By means of the position detection or position determination of the fluid meter by means of the sensor arrangement in combination with the temperature and convection determination, an improvement of the measurement accuracy is therefore achieved by reducing or even suppressing, preferably computationally, the effect of the convection, or of installation orientation and convection, on the measurement accuracy.

Advantageously, the orientation or installation position of the fluid meter and/or the flow direction of the medium may be provided as an establishable axis. In this way, the actual installation position (horizontal or vertical) of the fluid meter may be determined. The actual installation position may furthermore, for example, deviate from the ideal installation position (exactly horizontal or vertical) by irregularly installed pipeline systems or structural deviations of the connection housing. Even minimal differences may in this case lead to measurement errors, which may be avoided by determining the deviation and subsequently correcting this deviation. The measurement accuracy is thereby improved even more.

Expediently, an ultrasonic measuring arrangement which has an ultrasound measurement section and at least one, preferably two or more, ultrasound transducers may be provided as the measuring arrangement. The ultrasound measurement section may in this case extend in a straight line or obliquely, or may for example be deviated by reflectors or mirrors, so that it extends for example in a U-shape.

Preferably, the measuring arrangement for the flow quantity determination comprises an ultrasound measurement section and at least one ultrasound transducer for emitting and/or receiving an ultrasound signal. The ultrasound signal is in this case emitted along the ultrasound measurement section.

Furthermore, the flow quantity determination is preferably carried out with the aid of a time-of-flight difference of the time of flight of the ultrasound signal in and counter to the flow direction of the medium. The times of flight of the ultrasound signals are in this case determined continuously. The time-of-flight difference of the ultrasound signal is in this case at least substantially proportional to the average flow rate. The flow volume per unit time can subsequently be determined from the product of the average flow rate and the flow cross section. By such a flow quantity determination, a high measurement accuracy can be made possible over a large measurement range. Furthermore, the ultrasound measurement method is insensitive to pressure variations and flow variations, vibrations and bubble fractions (for example due to air inclusions).

According to one preferred configuration, the measuring arrangement for flow quantity determination is also used for temperature determination of the medium. In this way, it is possible to save on an additional sensor for the temperature determination of the medium. As a result, the cost and maintenance outlay is reduced to a significant extent.

Advantageously, the temperature determination of the medium may be carried out with the aid of a time-of-flight determination of the ultrasound signal, for example with the aid of a time-of-flight difference measurement. The temperature determination may, for example, be carried out by creating a calibration line or a calibration table for times of flight of the ultrasound signal for particular temperature ranges and flows for a particular medium (for example water). This calibration line may for example be stored in a memory, or data memory, of the control and evaluation unit of the fluid meter so that, by comparing the current measurement values with the values of the calibration table, the temperature of the medium can be determined in a straightforward way, for example by reading from the calibration table and/or calculation with the aid of values which have been read out.

As an alternative or in addition, the temperature determination of the medium and/or of the connection housing may be carried out with the aid of a temperature sensor, or temperature probe, provided therefor. Furthermore, an additional ultrasound sensor may also be provided for the temperature determination. It is particularly advantageous to carry out the temperature determination of the connection housing with the aid of the temperature sensor and to carry out the temperature determination of the medium with the aid of the measuring arrangement for the flow quantity determination.

Preferably, in this case the temperature difference between the temperature of the medium and the temperature of the connection housing is determined. The temperature difference is in this case used for determination of the convection in the medium. Furthermore, the size of the convection may be deduced using the level of the temperature difference.

By the axial and/or angular position being used for determination of the direction of the convection flow, the determination or establishment of the correction quantity or correction term (correction) may be derived with the aid of the direction of the convection flow and of the temperature difference of the connection housing and the medium for the flow rate, or the flow volume. The measurement accuracy is thereby improved to a significant extent.

Expediently, a data table may be provided, in which for example empirically determined data and system parameters are stored. The data table may for example be configured as a look-up table, which is stored in a data memory assigned to the fluid meter. The data table may therefore in a practical way be automatically updated or recalibrated or refreshed and/or supplemented by an update session in the scope of maintenance or radio transmission. Advantageously, the data table may also comprise the calibration table or the calibration parameters for the temperature determination.

Preferably, the time of flight of the ultrasound signal and/or the time-of-flight difference of the ultrasound signal in and counter to the flow direction of the medium and/or the temperature of the medium and/or the temperature of the connection housing and/or the installation position of the fluid meter and/or the density of the medium and/or the flow rate and the flow volume and/or the direction of the convection flow and/or the size of the convection flow are provided as empirically determined data and system parameters.

With the above and other objects in view there is also provided, in accordance with the invention, a fluid meter for flow quantity determination of a flowing medium, in particular such a fluid meter that is operated by the above-summarized method. The fluid meter comprising:

a connection housing with a feed and a discharge;

a measuring arrangement for acquiring measurement values for the flow quantity determination;

a sensor arrangement for determining at least one of a position or an inclination of the fluid meter, said sensor arrangement being configured to determine an axial and/or angular position of the fluid meter in relation to at least one establishable axis and/or direction;

a control and evaluation instrument configured to correct of the measurement values of the measuring arrangement by using the axial and/or angular position;

at least one device for determining a convection flow of the medium and for deriving a correction for the measurement values of the measuring arrangement from the convection flow.

In other words, the present invention also pertains to a fluid meter for flow quantity determination of a preferably flowing medium, which is operated in particular by means of the method according to the invention. The fluid meter expediently comprises a connection housing and a feed and a discharge for installation of the fluid meter in a fluid line system. The fluid meter furthermore comprises a control and evaluation instrument, which is used inter alia for operation of the fluid meter, a measuring arrangement for the flow quantity determination, and a sensor arrangement for position and/or inclination determination of the fluid meter. The sensor arrangement is configured to determine an axial and/or angular position of the fluid meter in relation to at least one predeterminable, or establishable, axis and/or direction. As an establishable axis, the orientation or the installation position of the fluid meter and/or the flow direction of the medium may for example be provided. Expediently, the control and evaluation instrument is configured to use the axial and/or angular position in this case for correction of the measurement values of the measuring arrangement. According to the invention, at least one means for determining a convection flow of the medium is in this case provided, a correction for the measurement values of the measuring arrangement being derivable from the convection flow which has been determined.

Preferably, a device for temperature determination of the medium and/or of the connection housing is respectively provided as the means for determining the convection flow of the medium. Using the temperature difference between the temperature of the connection housing and the temperature of the medium, the size or level of the convection flow may for example be determined.

According to one advantageous configuration of the fluid meter according to the invention, the measuring arrangement for the flow quantity determination may also be used as the device for temperature determination of the medium, so that besides the flow quantity determination the temperature of the medium is also determined by means of the measuring arrangement. The determination of the temperature is in this case preferably carried out with the aid of a time-of-flight measurement in conjunction with the temperature values, which are for example stored in the data memory of the fluid meter, empirically determined for the respective times of flight.

Expediently, at least one and/or respectively one temperature sensor may be provided as the device for temperature determination of the medium and/or of the connection housing.

As an alternative or in addition, the sensor arrangement for the position and/or inclination determination may be used as the means for determining the convection flow of the medium. By determining the installation orientation (position detection), the direction of the convection flow may be determined in a straightforward way. The direction of the convection flow may subsequently be used for determination, or calculation, of the level of the correction term, or of the correction.

It is particularly advantageous for the sensor arrangement to comprise a position and/or inclination sensor. In this way, the orientation in which the fluid meter is installed can be determined in a straightforward way, and for example transmitted to the control and evaluation instrument.

Furthermore, the control and evaluation instrument may be configured to derive the correction for the measurement values of the measuring arrangement from the convection flow which has been determined, i.e. to use the temperature of the medium and/or the temperature of the connection housing for correction of the measurement values of the measuring arrangement.

Preferably, the measuring arrangement for the flow quantity determination comprises an ultrasound measurement section and at least one ultrasound transducer for emitting and/or receiving an ultrasound signal. The ultrasound signal is in this case emitted along the ultrasound measurement section.

Other features which are considered as characteristic for the invention are set forth in the appended claims.

Although the invention is illustrated and described herein as embodied in a method for operating a fluid meter, and a fluid meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
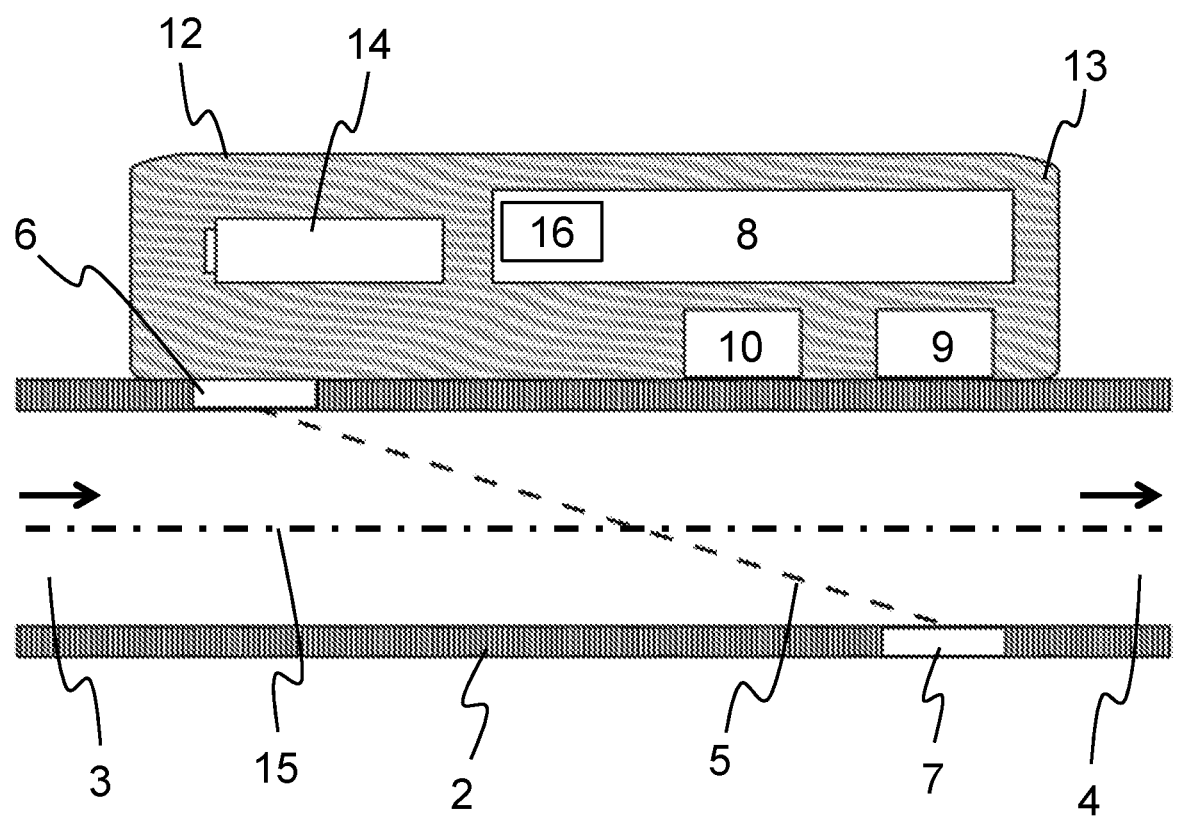
FIG. 1 shows a simplified schematic sectional representation of a first configuration of the fluid meter according to the invention.

Referring now to the figures of the drawing in detail and first, particularly, to FIG. 1 thereof, there is shown a fluid meter 1 according to the invention for flow quantity determination of a medium, which in particular is a flowing medium. The fluid meter 1 is, for example, a water meter or a bulk water meter, which is used for example for rated flows above 15 m$^3$/h. The fluid meter 1 comprises a connection housing 2, which can be installed by means of a feed 3 and a discharge 4 into a fluid line system. The flow direction of the medium, or of the water, is marked in FIG. 1 by black arrows, and extends from the feed 3 to the discharge 4. The measuring arrangement for the flow quantity determination is configured as an ultrasonic measuring arrangement and comprises two ultrasound transducers 6, 7, in particular piezoelectric ultrasound transducers, as well as an ultrasound measurement section 5 located between the ultrasound transducers 6, 7.

The water consumption, or the flow quantity of water, is determined in the case of the fluid meter 1 by the ultrasound transducers 6, 7 respectively emitting an ultrasound signal along the ultrasound measurement section 5. The ultrasound signals in this case travel in the flow direction and counter to the flow direction of the water, from one ultrasound transducer 6 to the other ultrasound transducer 7 and vice versa. Subsequently a time-of-flight difference, which is used for the flow quantity determination, may be determined, for example with the aid of the times of flight of the ultrasound signal in and counter to the flow direction. The time-of-flight determination is preferably carried out continuously.

The fluid meter 1 furthermore comprises a sensor arrangement, comprising a position sensor 9, for position and/or inclination determination, and a control and evaluation instrument 8 which is used inter alia for control of the ultrasound transducers 6, 7 (frequency selection, emission times or the like). Furthermore, the control and evaluation instrument 8 is used for evaluation and processing of the consumption data and/or of the data and measurement values which are determined by the measuring and/or sensor arrangements. A data memory 16 may furthermore be provided, which is for example configured to store the operating data and/or consumption data and/or equipment parameters and/or the properties of the medium or the like. A communication instrument (not represented in the figures) may furthermore be provided, which may be configured to transmit the data and/or equipment parameters e.g. by radio to a superordinate unit, such as the control center of the supplier or another data collector. Furthermore, the fluid meter 1 comprises a battery 14 for the energy supply. The control and evaluation instrument 8, the data memory 16 and the battery 14 are preferably fitted in an electronics housing 12, which is encapsulated with an encapsulation compound 13, i.e. is hermetically sealed, for example in order to prevent ingress of water and dust.

Expediently, the orientation or installation position 15 in which the fluid meter 1 is installed can be determined by the inclination and/or position sensor 9. Furthermore, the temperature of the connection housing 2 enclosing the medium is determined with a temperature probe or temperature sensor 10. Lastly, on the basis of the sound time of flight of the ultrasound signal, the temperature of the medium is determined, for example by means of a data table or a look-up table, in which the temperatures of the medium which are associated with the respective sound time of flight are stored. The greater the difference is between the temperature of the medium and the temperature of the connection housing 2, the higher or greater is the convection which is to be reckoned with in the medium.

Figure 2:
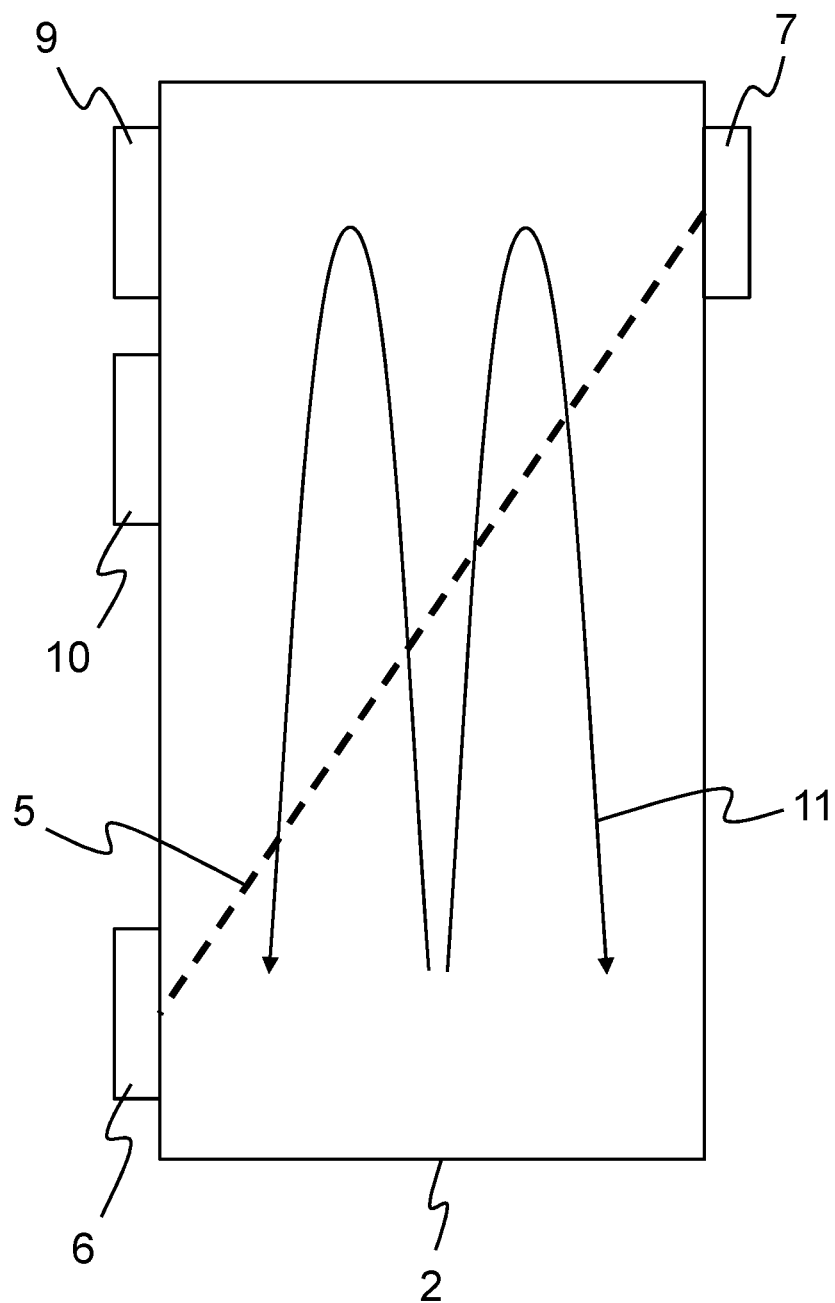
FIG. 2 shows a simplified schematic representation of another configuration of the fluid meter according to the invention, represented in the flow direction of the medium.

Reference number 11 in FIG. 2 denotes the convection flow in the medium, which occurs for example because of thermodynamic nonequilibria in the course of a temperature difference between the medium and the connection housing 2, and may have a negative effect on the measurement accuracy. The convection flow travels in FIG. 2 starting from the middle of the connection housing 2 to the wall of the connection housing 2, so that two essentially mirror-symmetrical convection cells are formed inside the connection housing 2. In order to determine the direction of the convection flow, information of the position sensor 9 is evaluated. Subsequently, for example with empirically determined time-of-flight differences, a correction of the measured times of flight is carried out on the basis of the temperature of the medium, the temperature of the connection housing 2 and the installation position 15 of the fluid meter 1. The empirically determined time-of-flight differences may for example be determined in advance, and for example stored in the data memory 16 as a data table or look-up table. By the correction of the measured times of flight, it is generally possible to carry out convection suppression in respect of the measurement results, in which a correction value or correction term (correction) for the time of flight and/or the time-of-flight difference is determined and applied on the basis of an inclination and/or position sensor as well as the medium temperature and connection housing temperature.

It will be understood that the disclosure content also includes individual feature combinations (subcombinations) and possible combinations, not represented in the drawing figures, of individual features of different configurations.

The following is a summary list of reference numerals and the corresponding structure used in the above description of the invention:

1 fluid meter
2 connection housing
3 feed
4 discharge
5 ultrasound measurement section
6 ultrasound transducer
7 ultrasound transducer
8 control and evaluation instrument
9 position sensor
10 temperature sensor
11 convection flow
12 electronics housing
13 encapsulation compound
14 battery
15 installation position
16 data memory

The invention claimed is:

1. A method of operating a fluid meter, the method comprising:

carrying out a flow quantity determination by way of a measuring arrangement;

providing a sensor arrangement for at least one of a position determination or an inclination determination;

causing the sensor arrangement to determine at least one of an axial position or angular position of the fluid meter in relation to at least one establishable axis and/or direction;

using at least one of the axial position or the angular position for correcting of measurement values acquired by the measuring arrangement; and determining a convection flow of the medium in the fluid meter, and deriving a correction of the measurement values of the measuring arrangement from the convection flow.

2. The method according to claim 1, wherein the step of determining the convection flow comprises determining a temperature of the medium and/or a temperature of a connection housing.

3. The method according to claim 2, which comprises determining the temperature of the medium inside or outside the fluid meter.

4. The method according to claim 2, which comprises determining the temperature of the connection housing.

5. The method according to claim 1, wherein the establishable axis is defined by an installation position of the fluid meter and/or by a flow direction of the medium in the fluid meter.

6. The method according to claim 1, wherein the measuring arrangement is an ultrasonic measuring arrangement having an ultrasound measurement section and at least one ultrasound transducer.

7. The method according to claim 6, which comprises determining the flow quantity with the aid of a time-of-flight difference of a time of flight of the ultrasound signal in the medium.

8. The method according to claim 2, which comprises using the measuring arrangement for determining a temperature of the medium.

9. The method according to claim 6, which comprises determining a temperature of the medium by measuring a time-of-flight of the ultrasound signal.

10. The method according to claim 2, which comprises providing a temperature sensor and determining a temperature of the medium and/or of the connection housing with the temperature sensor.

11. The method according to claim 1, which comprises determining a temperature difference between a temperature of the medium and a temperature of a connection housing of the flow meter, and using the temperature difference for determining a convection in the medium.

12. The method according to claim 1, which comprises using at least one of the axial position or the angular position for determining a direction of the convection flow.

13. The method according to claim 2, which comprises providing a data table in which empirically determined data and system parameters are stored.

14. The method according to claim 13, wherein the empirically determined data and system parameters are selected from the group consisting of a time of flight of an ultrasound signal, a time-of-flight difference of the ultrasound signal in and counter to a flow direction of the medium, a temperature of the medium and/or a temperature of the connection housing, an installation position of the fluid meter, a density of the medium, a flow rate and a flow volume, a direction of the convection flow and a strength of the convection flow.

15. A fluid meter for flow quantity determination of a flowing medium, the fluid meter comprising:

a connection housing with a feed and a discharge;

a measuring arrangement for acquiring measurement values for the flow quantity determination;

a sensor arrangement for determining at least one of a position or an inclination of the fluid meter, said sensor arrangement being configured to determine an axial and/or angular position of the fluid meter in relation to at least one establishable axis and/or direction;

a control and evaluation instrument configured to correct of the measurement values of the measuring arrangement by using the axial and/or angular position;

at least one device for determining a convection flow of the medium and for deriving a correction for the measurement values of the measuring arrangement from the convection flow.

16. The fluid meter according to claim 15, wherein said at least one device for determining the convection flow of the medium is a device for determining a temperature of the medium and/or of said connection housing.

17. The fluid meter according to claim 16, wherein said measuring arrangement is used as said device for determining the temperature of the medium.

18. The fluid meter according to claim 16, which comprises a temperature sensor being the device for determining the temperature of the medium and/or of the connection housing.

19. The fluid meter according to claim 15, wherein said sensor arrangement for determining the position and/or inclination is said device for determining the convection flow of the medium.

20. The fluid meter according to claim 15, wherein said sensor arrangement comprises an inclination and/or position sensor.

21. The fluid meter according to claim 15, wherein said control and evaluation instrument is configured to derive the correction for the measurement values of the measuring arrangement from the convection flow.

22. The fluid meter according to claim 15, wherein said measuring arrangement comprises an ultrasound measurement section and at least one ultrasound transducer for emitting and/or receiving an ultrasound signal, and wherein the ultrasound signal is emitted along the ultrasound measurement section.

* * * * *